(12) United States Patent
Lee et al.

(10) Patent No.: US 10,260,616 B2
(45) Date of Patent: Apr. 16, 2019

(54) EXTRA-LARGE EXCAVATOR HYDRAULIC PUMP DRIVE GEAR BOX LUBRICATION AND NOISE ATTENUATION DEVICE

(71) Applicant: KOREA INSTITUTE OF MACHINERY & MATERIALS, Daejeon (KR)

(72) Inventors: Yong-Bum Lee, Daejeon (KR); Tea Seok Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 285 days.

(21) Appl. No.: 15/197,920

(22) Filed: Jun. 30, 2016

(65) Prior Publication Data

US 2017/0102066 A1  Apr. 13, 2017

(30) Foreign Application Priority Data

Oct. 13, 2015 (KR) .................. 10-2015-0142521

(51) Int. Cl.
*F16H 57/00* (2012.01)
*F16H 57/04* (2010.01)
*F16H 61/00* (2006.01)
*F16H 1/22* (2006.01)

(52) U.S. Cl.
CPC ..... *F16H 57/0423* (2013.01); *F16H 57/0457* (2013.01); *F16H 57/0495* (2013.01); *F16H 1/22* (2013.01)

(58) Field of Classification Search
CPC ............. F16H 57/0423; F16H 57/0457; F16H 57/0495
See application file for complete search history.

(56) References Cited

U.S. PATENT DOCUMENTS

| | | | | |
|---|---|---|---|---|
| 2,714,428 | A * | 8/1955 | Green | F01M 9/06 184/11.1 |
| 9,103,432 | B2 | 8/2015 | Isomura et al. | |
| 9,212,736 | B2 | 12/2015 | Okuta | |
| 9,907,227 | B2 * | 3/2018 | Hadwani | A01D 41/12 |

(Continued)

FOREIGN PATENT DOCUMENTS

| | | |
|---|---|---|
| JP | 2012-167792 | 9/2012 |
| JP | 2012-180897 | 9/2012 |
| JP | 2015-034581 | 2/2015 |

(Continued)

*Primary Examiner* — Jake Cook
(74) *Attorney, Agent, or Firm* — Lex IP Meister, PLLC

(57) ABSTRACT

A device for lubrication and noise attenuation of a gear box includes: a case housing where a lubricant is provided in the bottom side thereof; a driving gear provided in the case housing and rotating by a driving torque of an engine; first and second driven gears engaged to lateral sides of the driving gear and rotating; and a third driven gear engaged to an upper side of the driving gear and rotating, wherein the case housing includes a lubrication plate provided in an inclined manner from an upper side of the first driven gear to one side of the third driven gear such that the lubricant drawn up by rotation torque of the first driven gear is churned to an inner surface of the lubrication plate and then dropped at the upper side of the first driven gear and one side of the third driven gear for lubrication.

7 Claims, 4 Drawing Sheets

(a)

(b)

(56) References Cited

U.S. PATENT DOCUMENTS

2005/0230215 A1* 10/2005 Kimura ................ F16H 57/043
                                                          192/48.8
2013/0233107 A1*  9/2013 Von Wilmowsky ........................
                                                        F16H 57/027
                                                           74/421 R

FOREIGN PATENT DOCUMENTS

KR    10-1998-0054007    9/1998
KR    10-2004-0040860    5/2004
KR    10-2014-0088634    7/2014
WO        2012-144035    10/2012

* cited by examiner (a)

(b)

EXTRA-LARGE EXCAVATOR HYDRAULIC PUMP DRIVE GEAR BOX LUBRICATION AND NOISE ATTENUATION DEVICE

CROSS-REFERENCE TO RELATED APPLICATION

This application claims priority to and the benefit of Korean Patent Application No. 10-2015-0142521 filed in the Korean Intellectual Property Office on Oct. 13, 2015, the entire contents of which are incorporated herein by reference.

BACKGROUND OF THE INVENTION (a) Field of the Invention

The present invention relates to a gear box for driving a hydraulic pump provided in an extra-large sized excavator and the like.

(b) Description of the Related Art

In general, a plurality of gears are arranged in a transmission, such as an accelerator, a decelerator, and the like, provided in various driving devices such as a vehicle, a generator, and the like to transmit driving force input through an input shaft to an output shaft by increasing/decreasing the driving force, and the transmission is typically referred to as a gear box.

Prior to actual use of such a gear box, the gear box should satisfy a performance test according to a number of requirements, that is, durability and precise torque transmission characteristics of the gear box.

In particular, large-scaled equipment such as an extra-large sized excavator generates loud noise when driving a hydraulic pressure pump mounted to the gear box, and accordingly, a means for reducing the noise is required.

A configuration of a conventional gear box mounted to large-scaled equipment such as an extra-large sized excavator is as follows.

In general, in an extra-large sized excavator (e.g., with a vehicle body weight of greater than 90 tons), three or more hydraulic pressure pumps are provided per single engine driving shaft to operate a hydraulic system, thereby reducing fuel consumption.

Such a gear body of the extra-large sixed excavator is provided with a plurality of gears formed of driving gears and driven gears in an outer case. In addition, when the gears are partially rotated with a predetermined depth from an internal bottom of the case, lubricant stored in the case lubricates the gears while they rotate.

In such a gear box, when the plurality of gears provided in the gear box rotate, the lubricant is churned by the rotating gears such that a lubrication portion expands to a portion not submerged by the lubricant, and accordingly the gears can smoothly rotate.

However, in the conventional gear box provided in the extra-large sized excavator, the lubricant is churned by the rotating gears such that the lubrication portion expands to the portion not submerged by the lubricant, but other portions cannot be lubricated.

Further, since a portion where the lubricant is not supplied is relatively large in the conventional gear box, friction noise due to a power transmission error of the gear is increased, and loud load noise occurs due to friction between gears rotating at a high-speed and air or due to vibration of a shaft system or structural vibration.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for lubrication and noise attenuation of a gear box for driving a hydraulic pressure pump of an extra-large sized excavator that can improve power transmission efficiency by enhancing lubrication performance between gears and at the same time remarkably attenuate noise.

A device for lubrication and noise attenuation of a gear box for driving a hydraulic pressure pump of an extra-large sized excavator according to an exemplary embodiment of the present invention includes: a case housing where a lubricant is provided in the bottom side thereof; a driving gear provided in the case housing and rotating by a driving torque of an engine; first and second driven gears engaged to lateral sides of the driving gear and rotating in the case housing; and a third driven gear engaged to an upper side of the driving gear and rotating, wherein the case housing may include a lubrication plate provided in an inclined manner from an upper side of the first driven gear to one side of the third driven gear such that the lubricant drawn up by rotation torque of the first driven gear is churned to an inner surface of the lubrication plate and then dropped at the upper side of the first driven gear and one side of the third driven gear for lubrication.

The device for lubrication and noise attenuation of the gear box for driving the hydraulic pressure pump of the extra-large sized excavator may further include an auxiliary lubrication plate separately provided in an outer side of the third driven gear for lubrication with the lubricant which is churned up along the inner surface of the lubrication plate by the rotation torque of the first and third driven gears, drawn up to the upper side of the third driven gear, and then dropped to the upper surface of the third driven gear.

The device for lubrication and noise attenuation of the gear box for driving the hydraulic pressure pump of the extra-large sized excavator may further include a round-shaped auxiliary plate separately provided at an outer side of the second driven gear.

The lubrication plate may include a flange portion formed by being bent at lateral sides thereof, and the auxiliary lubrication plate may include an auxiliary flange portion formed by being bent at lateral sides thereof.

The lubrication plate may be gradually narrowed toward an upper side from a lower side thereof.

An air path hole may be provided for air ventilation between the lubrication plate and the auxiliary lubrication plate.

The auxiliary lubrication plate may be curved at a distance at an outer side of the third driven gear and may include a straight-line shaped plate formed in the shape of a straight line such that the lubricant promptly flows down therethrough, is separated to an outer side of the third driven gear and being bent, and of which an end of the straight-line shape plate may protrude further toward the driving gear than a connection bracket that connects the auxiliary lubrication plate and the auxiliary plate.

The device for lubrication and noise attenuation of the gear box for driving the hydraulic pressure pump of the extra-large sized excavator may include connection ribs provided in other sides of the lubrication plate, the auxiliary lubrication plate, and the auxiliary plate to connect the lubrication plate, the auxiliary lubrication plate, and the auxiliary plate to an inner surface of the case housing. The installation rib may be formed in the shape of a lattice or a zigzag.

According to the exemplary embodiment of the present invention, the device for lubrication and noise attenuation of the gear box for driving the hydraulic pressure pump of the extra-large sized excavator can remarkably attenuate noise by enhancing a lubrication friction rate between gears and at the same time improve power transmission efficiency. Further, noise can be offset because a resonance between the lubrication plate and the gear is small in the gear box.

DETAILED DESCRIPTION OF THE EMBODIMENTS

Figure 1:
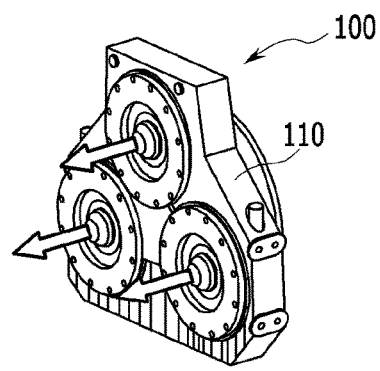
FIG. 1 is a perspective view and a separated perspective view of a device for lubrication and noise attenuation of a gear box for driving a hydraulic pressure pump of an extra-large sized excavator according to an exemplary embodiment of the present invention.
Figure 1:
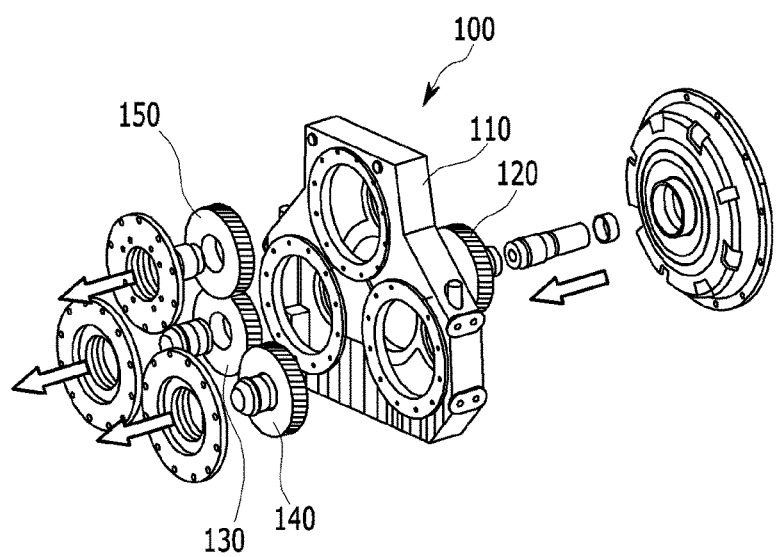

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In addition, the size and thickness of each configuration shown in the drawings are arbitrarily shown for better understanding and ease of description, but the present invention is not limited thereto.

In addition, unless explicitly described to the contrary, the word "comprise" and variations such as "comprises" or "comprising" will be understood to imply the inclusion of stated elements but not the exclusion of any other elements.

Figure 2:
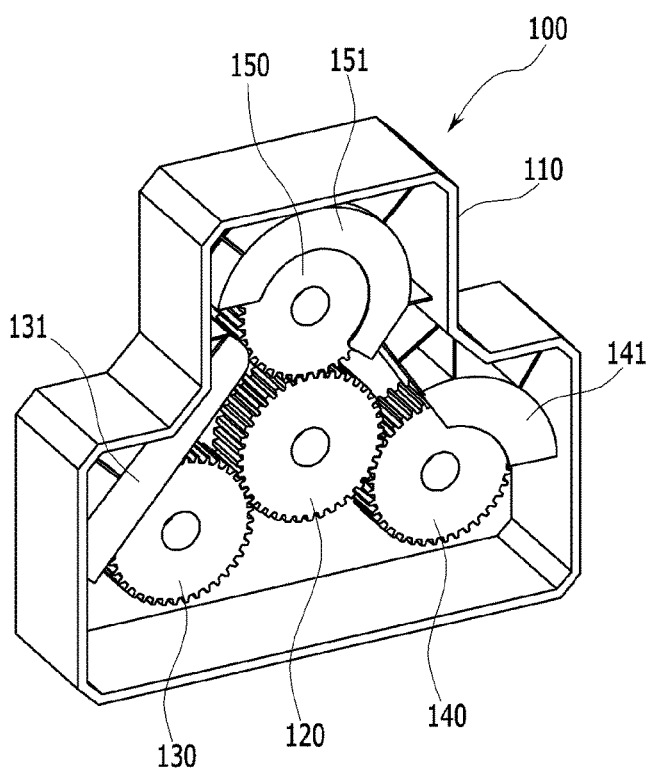
FIG. 2 is a schematic perspective view of a primary part of the device for lubrication and noise attenuation of the gear box for driving the hydraulic pressure pump of the extra-large sized excavator according to the exemplary embodiment of the present invention.
Figure 3:
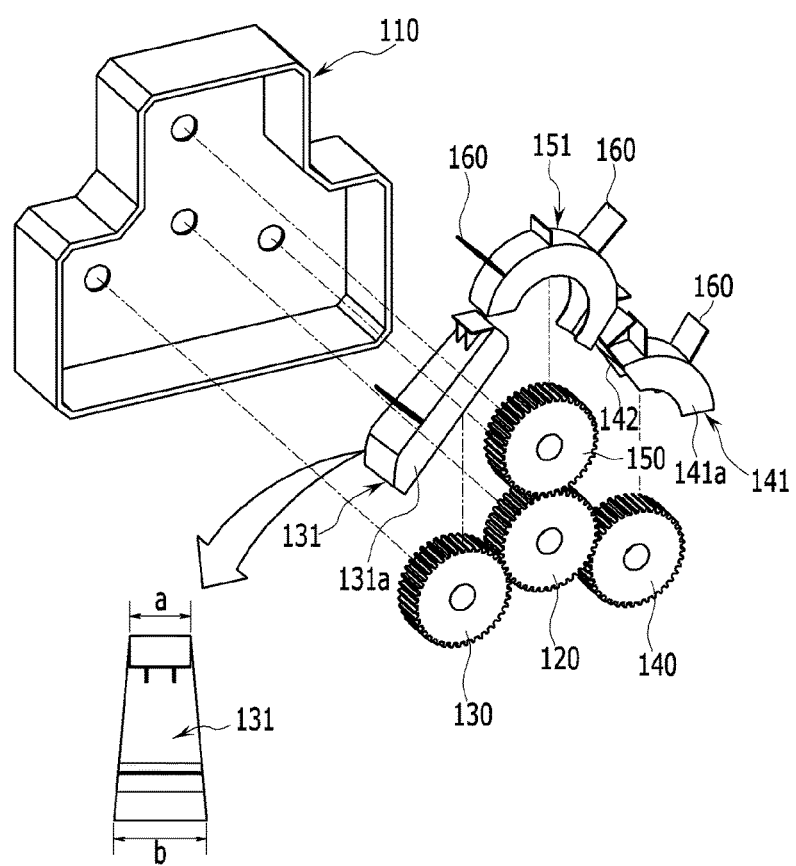
FIG. 3 is a schematic separated perspective view of a primary part of the device for lubrication and noise attenuation of the gear box for driving the hydraulic pressure pump of the extra-large sized excavator according to the exemplary embodiment of the present invention.
Figure 4:
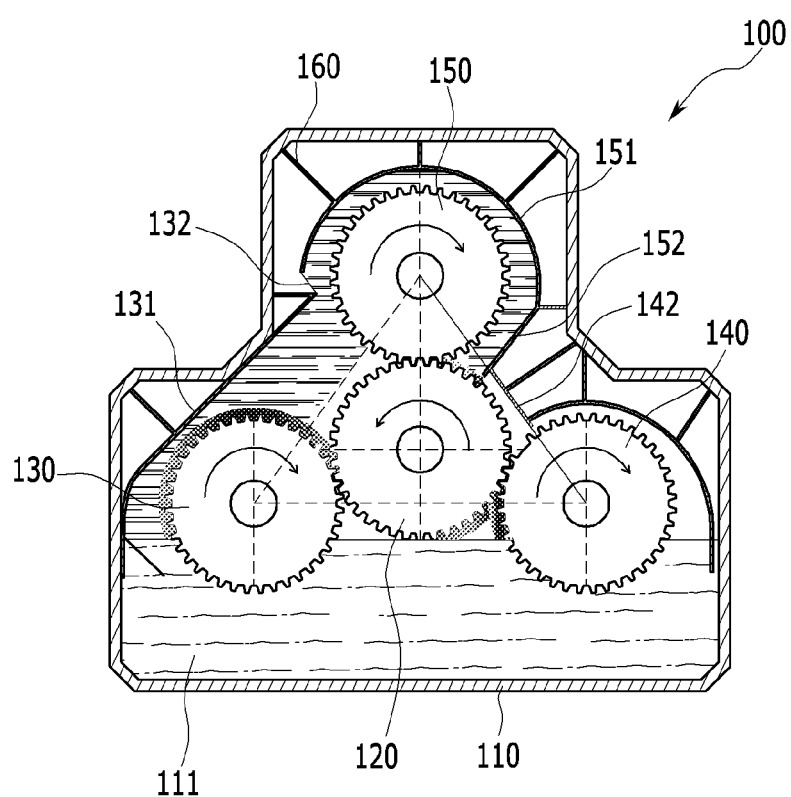
FIG. 4 is a schematic view illustrating a state in which gears are lubricated by the device for lubrication and noise attenuation of the gear box for driving the hydraulic pressure pump of the extra-large sized excavator according to the exemplary embodiment of the present invention.

As shown in FIG. 1 to FIG. 4, a device for lubricating and noise attenuation of a gear box 100 for driving of a hydraulic pressure pump of an extra-large sized excavator according to an exemplary embodiment of the present invention includes the gear box 100. The gear box 100 is formed of a case housing 110 wherein a lubricant 111 is provided in the bottom side thereof, a driving gear 120 provided in the case housing 110 and rotated by a driving torque of an engine, first and second driven gears 130 and 140 rotating by being engaged to lateral sides of the driving gear 120 in the case housing 110, and a third driven gear 150 rotating by being engaged to an upper side of the driving gear 120 such that driving torque of the driving gear 120 is transmitted through the first, second, and third driven gears 130, 140, and 150.

In such a gear box 100, a lubrication plate 131, an auxiliary lubrication plate 151, and an auxiliary plate 141 are included. The lubrication plate 131 is separately provided in the casing housing 110 in an inclined manner from an upper side of the first driven gear 130 to one side of the third driven gear 150 such that the lubricant 111 is drawn up by the rotation torque of the first driven gear 130, churned to an inner surface thereof, and then dropped down while lubricating the upper side of the first driven gear 130 and the one side of the third driven gear 150.

The auxiliary lubrication plate 151 is separately provided in an outer side of the third driven gear 150, and thus lubricant churned up along the inner surface of the lubrication plate 131 by the rotation torque of the first and third driven gears 130 and 150 is moved up toward the upper side of the third driven gear 150 and then dropped down to the upper surface of the third driven gear 150 for lubrication.

The auxiliary plate 141 is formed in a round shape and is separately provided at an outer side of the second driven gear 140.

In the gear box having the above-stated configuration, the driving gear 120 receives driving force of the engine and thus rotates along the arrow direction (see FIG. 4), and then the first, second, and third driven gears 130, 140, and 150 rotate along the arrow direction.

Then, the lubricant 111 is churned up to the upper surface of the first driven gear 130, and at the same time, while the lubricant 111 is churned up along the inner surface of the lubrication plate 131 by the rotation torque of the first driven gear 130, a part of the lubricant 111 is partially dropped to the upper surface of the first driven gear 130 and thus lubricates the upper surface of the first driven gear 130, and another part of the lubricant 111 is churned up along an inner side of the auxiliary lubrication plate 151 while being continuously churned up along the inner surface of the lubrication plate 131, and is then dropped to the upper surface of the third driven gear 150 such that the driving gear 120 and the third driven gear 150 can be more effectively lubricated.

As described, in the device for lubrication and noise attenuation of the gear box 100 for driving of the hydraulic pump of the extra-large sized excavator according to the exemplary embodiment of the present invention, a lubrication friction surface with the first, second, and third driven gears 130, 140, and 150 that rotate together with the driving gear 120 while being engaged along the rotation of the driving gear 120 is expanded, and thus lubrication performance and driving performance can be improved and at the same time driving noise can be remarkably reduced.

The exemplary embodiment of the present invention will now be described in detail, focusing on the gear box 100 formed of a single input shaft and three output shafts. However, the present invention is not limited thereto, and one output shaft may be connected to one input shaft, or two or more output shafts may be connected to one input shaft in the gear box 100.

In addition, the lubrication plate 131 is provided with a flange portion 131a of which lateral sides are bent.

The auxiliary lubrication plate 151 is also provided with an auxiliary flange portion 151a of which lateral sides are bent.

Further, the auxiliary plate 141 is provided with an auxiliary flange portion 141a of which lateral sides are bent.

Thus, the flange portions 131a formed not only in an inner surface but also in the lateral sides of the lubrication plate 131 let the lubricant be collected to the upper surface side of the first driven gear 130 and then dropped therefrom by preventing the lubricant from scattering to the outer side by the rotation torque of the first driven gear 130 such that lubrication rate can be improved.

Likewise, the lubricant churned to the inner surface of the auxiliary lubrication plate 151 and moved upward along the auxiliary lubrication plate 151 by the driving torque of the first driven gear 130 is prevented from being scattered to the outside by the auxiliary flange portion 151a formed in the lateral sides of the auxiliary lubrication plate 151 and thus collected to the upper surface side of the third driven gear 150 and then dropped therefrom, thereby improving lubrication rate.

In addition, a lower side width b (see FIG. 3) of the lubrication plate 131 is wider than an upper side width a thereof.

That is, the lubrication plate 131 is gradually narrowed toward the upper side a from the lower side b.

This is because the lower side of the lubrication plate 131 has much more lubricant that is scattered upward by the rotation torque of the first driven gear 130 than the upper side of the lubricant plate 131 such that the lubricant in the lower side of the lubrication plate 131 can be collected.

As described, according to the exemplary embodiment of the present invention, lubricant scattered upward by the rotation torque of the driving gear 120 provided in the case housing 110 of the gear box 100 is collected to the inner wall surface of the lubrication plate 131 and the auxiliary lubrication plate 151 provided in the case housing 110 of the gear box 100 and then dropped back to the upper side of the driven gear that rotates by being engaged to the driving gear 120, such that a lubrication surface area can be expanded, thereby improving lubrication efficiency and driving efficiency, and at the same time reducing friction noise between gears.

Here, the lubrication plate 131 and the auxiliary lubrication plate 151 serve as a path for a lubrication groove where the lubricant scattered upward by high-speed rotation torque of the gear is collected.

In addition, installation ribs 160 are provided in the other side of each of the lubrication plate 131, the auxiliary lubrication plate 151, and the auxiliary plate 141 for connection to an inner surface of the case housing 110 of the gear box 100.

The installation ribs 160 can attenuate noise such as friction noise or other structural vibration generated from inner sides of the lubrication plate 131, the auxiliary lubrication plate 151, and the auxiliary plate 141.

The installation ribs 160 is formed in the shape of lattices, zigzags, and the like, thereby increasing a noise attenuation effect.

Further, the installation rib 160 is preferably made of a resin material or provided as a noise absorbing means such as a porous plate so as to absorb noise.

In addition, an air path hole 132 is provided between the lubrication plate 131 and the auxiliary lubrication plate 151 for air ventilation to thereby preventing occurrence of an air pressure difference in the gear box 100.

Accordingly, air pressure of the inside of the lubrication plate 131, the auxiliary lubrication plate 151, and the auxiliary plate 141 and air pressure of the outside of the lubrication plate 131, the auxiliary lubrication plate 151, and the auxiliary plate 141 can be maintained equally in the case housing 110 of the gear box 100.

In addition, the auxiliary lubrication plate 151 and the auxiliary plate 141 are connected by being fixed at their ends by a connection bracket 142.

Further, the auxiliary lubrication plate 151 has a curved shape and is distanced from the outside of the third driven gear 150, but one end of the auxiliary lubrication plate 151 is provided as a straight-line shaped plate 152 such that lubricant can quickly flow down to the driving gear 120. The straight-line shaped plate 152 protrudes further toward the driving gear 120 than the connection bracket 142.

Thus, the lubricant scattered to the inner side of the auxiliary lubrication plate 151 is promptly dropped to the driving gear 120 for lubrication.

As described, in the device for lubrication and noise attenuation of the gear box 100 that drives the hydraulic pressure pump of the extra-large sized excavator, the gear box 100 is formed by connecting one or plurality of output shafts to one input shaft, and is provided with the lubrication plate that causes lubricant to be churned up while being scattered to the upper side of the gear provided in the gear box by rotation torque of the gear rotating at a high speed and then dropped to the upper side of the gear for lubrication so as to attenuate noise. Further ribs, which are sound absorbing means such as a resin material or a porous plate, are provided in an outer side of the lubrication plate to reduce vibration, and accordingly, lubrication performance between gears can be enhanced, thereby improving power transmission efficiency and remarkably attenuating noise.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: gear box | |
| 110: case housing | |
| 120: drive gear | |
| 130: first driven gear | 131: lubrication plate |
| 131a: flange portion | 132: air path hole |
| 140: second driven gear | 141: auxiliary plate |
| 141a: auxiliary flange portion | 142: connection plate |
| 150: third driven gear | 151: auxiliary lubrication plate |
| 151a: auxiliary flange portion | 152: straight-line shaped plate |
| 160: installation rib | |

What is claimed is:

1. A device for lubrication and noise attenuation of a gear box for driving a hydraulic pressure pump of an extra-large sized excavator, comprising:

a case housing where a lubricant is provided in a bottom side thereof;

a driving gear provided in the case housing and rotating by a driving torque of an engine;

first and second driven gears engaged to lateral sides of the driving gear and rotating in the case housing; and a third driven gear engaged to an upper side of the driving gear and rotating, wherein the case housing comprises a lubrication plate provided in an inclined manner from an upper side of the first driven gear to one side of the third driven gear such that the lubricant drawn up by rotation torque of the first driven gear is churned to an inner surface of the lubrication plate and then dropped at the upper side of the first driven gear and one side of the third driven gear for lubrication, and further comprises an auxiliary lubrication plate separately provided in an outer side of the third driven gear for lubrication with the lubricant which is churned up along the inner surface of the lubrication plate by the rotation torque of the first and third driven gears, drawn up to an upper side of the third driven gear, and then dropped to an upper surface of the third driven gear.

2. The device for lubrication and noise attenuation of the gear box for driving the hydraulic pressure pump of the extra-large sized excavator of claim 1, further comprising a round-shaped auxiliary plate separately provided at an outer side of the second driven gear.

3. The device for lubrication and noise attenuation of the gear box for driving the hydraulic pressure pump of the extra-large sized excavator of claim 1, wherein the lubrication plate comprises a flange portion formed by being bent at lateral sides thereof, and the auxiliary lubrication plate comprises an auxiliary flange portion formed by being bent at lateral sides thereof.

4. The device for lubrication and noise attenuation of the gear box for driving the hydraulic pressure pump of the extra-large sized excavator of claim 3, wherein the lubrication plate is narrowed toward an upper side from a lower side thereof.

5. The device for lubrication and noise attenuation of the gear box for driving the hydraulic pressure pump of the extra-large sized excavator of claim 1, wherein an air path hole is provided for air ventilation between the lubrication plate and the auxiliary lubrication plate.

6. The device for lubrication and noise attenuation of the gear box for driving the hydraulic pressure pump of the extra-large sized excavator of claim 2, wherein the auxiliary lubrication plate includes a curved portion curved at a distance at the outer side of the third driven gear and a straight-line shaped plate disposed at an end of the curved portion of the auxiliary lubrication plate and formed in the shape of a straight line such that the lubricant promptly flows down therethrough, and wherein an end of the straight-line shaped plate protrudes further toward the driving gear than a connection bracket that is disposed between the end of the straight-line shaped plate and an end of the auxiliary plate and connects the auxiliary lubrication plate and the auxiliary plate.

7. The device for lubrication and noise attenuation of the gear box for driving the hydraulic pressure pump of the extra-large sized excavator of claim 2, comprising connection ribs provided in an outer surface of the lubrication plate, an outer surface of the auxiliary lubrication plate, and an outer surface of the auxiliary plate to connect the lubrication plate, the auxiliary lubrication plate, and the auxiliary plate to an inner surface of the case housing.

* * * * *